(12) United States Patent
Ice

(10) Patent No.: US 7,670,063 B2
(45) Date of Patent: Mar. 2, 2010

(54) OPTICAL TRANSCEIVER WITH VARIABLY POSITIONED INSERT

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 1463 days.

(21) Appl. No.: 11/026,439

(22) Filed: Dec. 30, 2004

(65) Prior Publication Data

US 2005/0185963 A1 Aug. 25, 2005

Related U.S. Application Data

(60) Provisional application No. 60/533,307, filed on Dec. 30, 2003.

(51) Int. Cl.
G02B 6/36 (2006.01)
H04B 10/00 (2006.01)

(52) U.S. Cl. .............................. 385/92; 385/88; 385/89; 385/76; 385/77; 398/135; 398/139

(58) Field of Classification Search .................. 385/88, 385/89, 53, 76, 77, 78, 92, 93, 94, 52; 398/135, 398/136, 128, 129, 130, 131, 139, 138
See application file for complete search history.

(56) References Cited

U.S. PATENT DOCUMENTS 5,598,495 A * 1/1997 Rittle et al. .................... 385/75
6,792,171 B2 * 9/2004 Hargis et al. .................. 385/14
7,280,724 B2 * 10/2007 Yoshikawa .................... 385/52
7,309,170 B2 * 12/2007 Ice et al. ........................ 385/88
2005/0180754 A1 * 8/2005 Mizue et al. ................. 398/135
2005/0185963 A1 * 8/2005 Ice .............................. 398/135

OTHER PUBLICATIONS

"Fiber Optic Connectors," Fiber-Optics, available at http://www.fiber-optics.info/articles/connector-care.htm.

* cited by examiner

Primary Examiner—Brian M Healy
(74) Attorney, Agent, or Firm—Workman Nydegger

(57) ABSTRACT

An optical transceiver includes a transceiver housing configured to receive an optical sub-assembly insert. The optical sub-assembly insert includes duplex cavities configured to hold a transmit optical sub-assembly front end and a receive optical sub-assembly front end in a fixed spatial orientation for a given optical connector interface. The optical sub-assembly insert is configurable to fit inside a transceiver housing with a relatively wide range of X and Y dimensional tolerance. In one implementation, the X-Y position of the optical sub-assembly insert is dictated by the position of the transmit optical-sub assembly front end after its corresponding back end has been mounted to a heat dissipation element. Any gaps that form between the optical sub-assembly insert and the inside surface of the transceiver housing as a result of the transmit optical sub-assembly position can be accommodated with filler material.

22 Claims, 4 Drawing Sheets

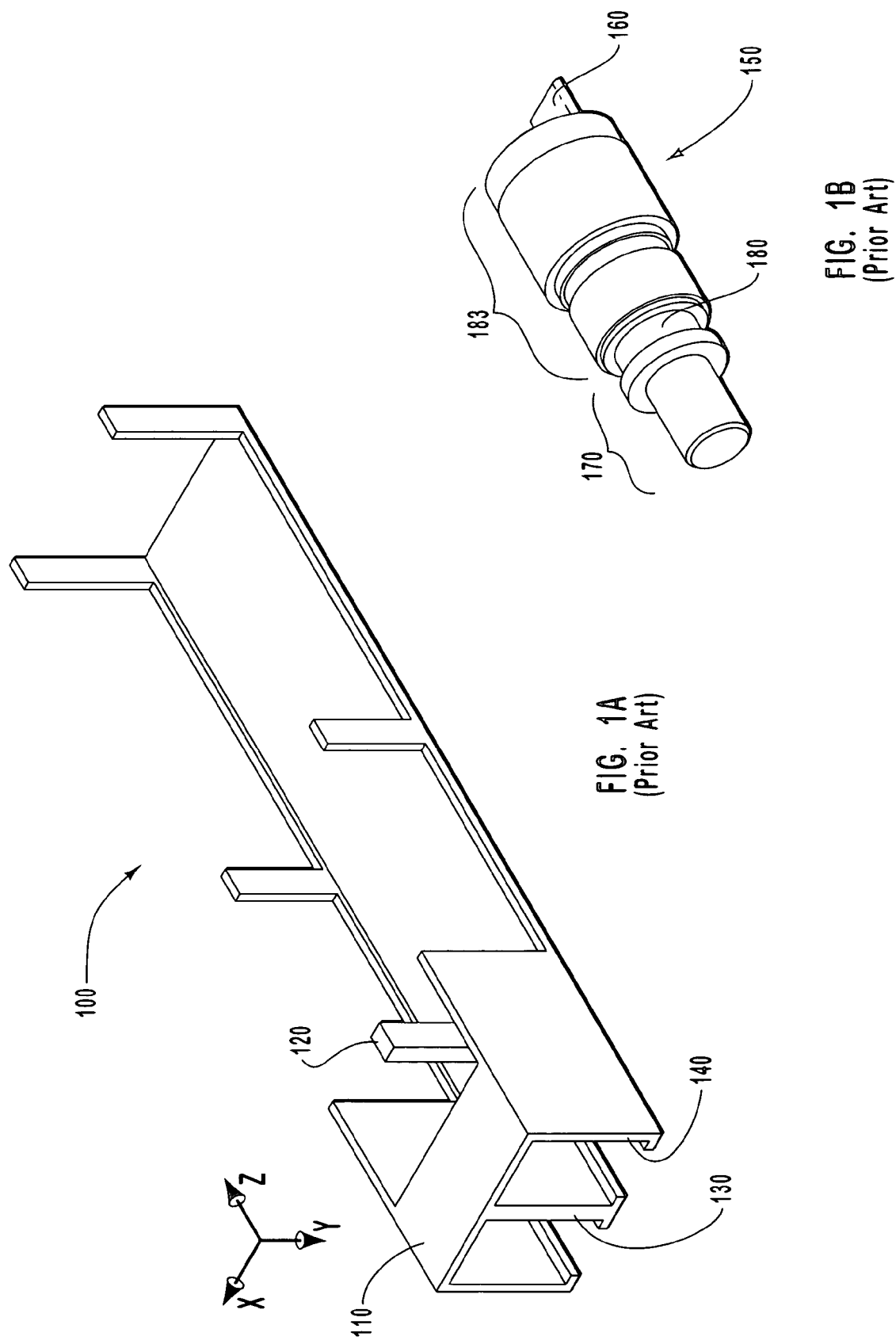

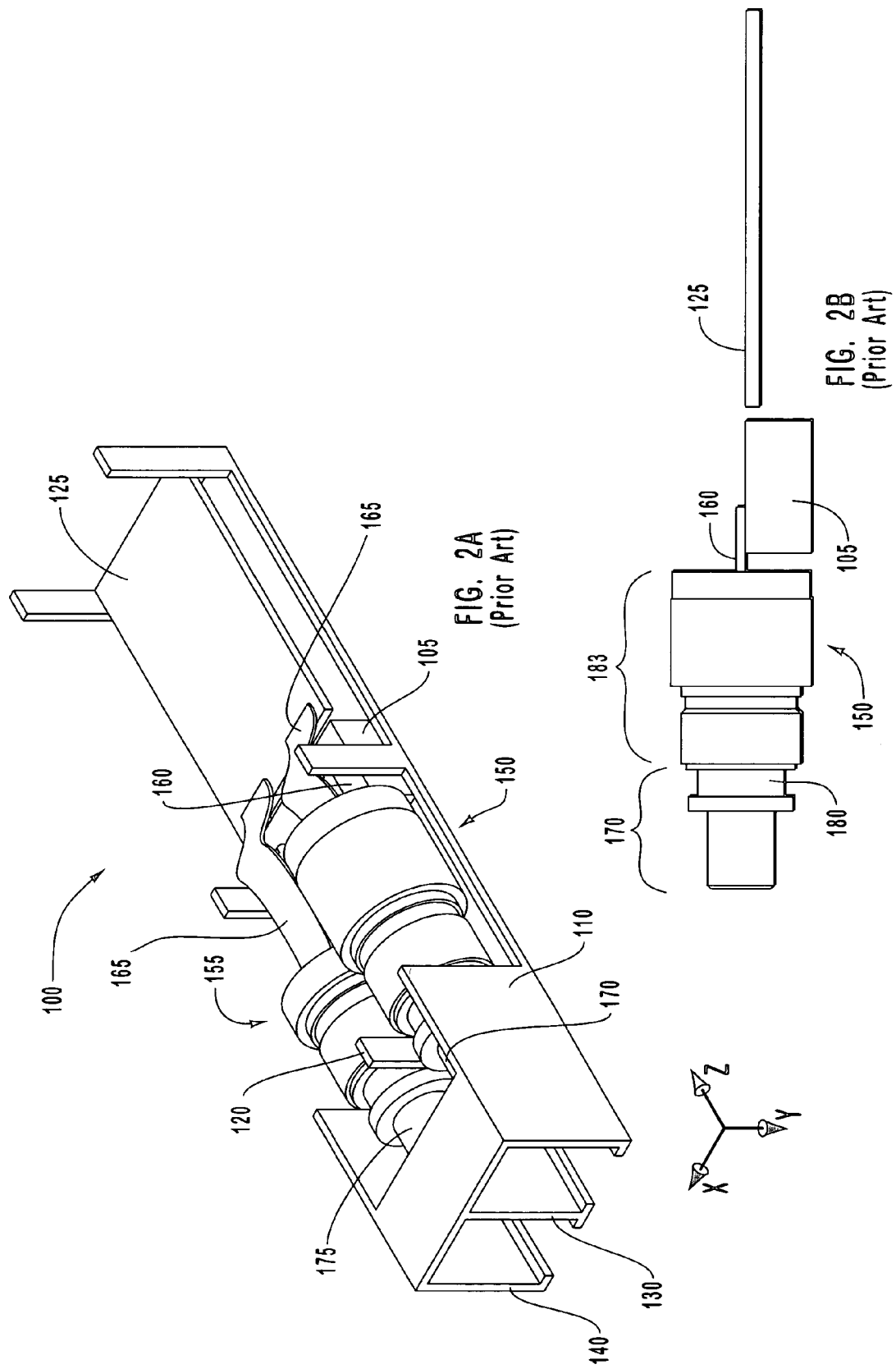

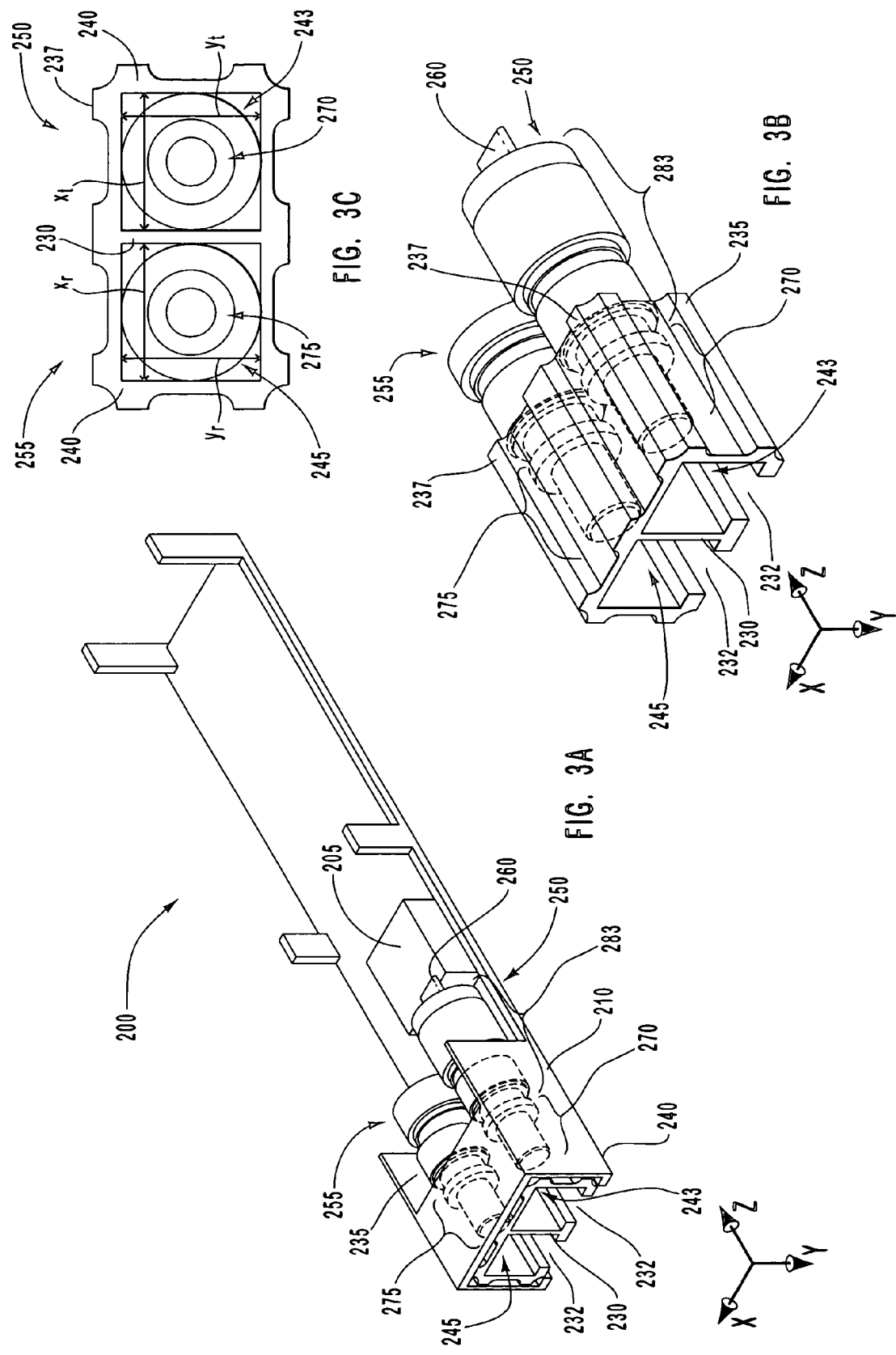

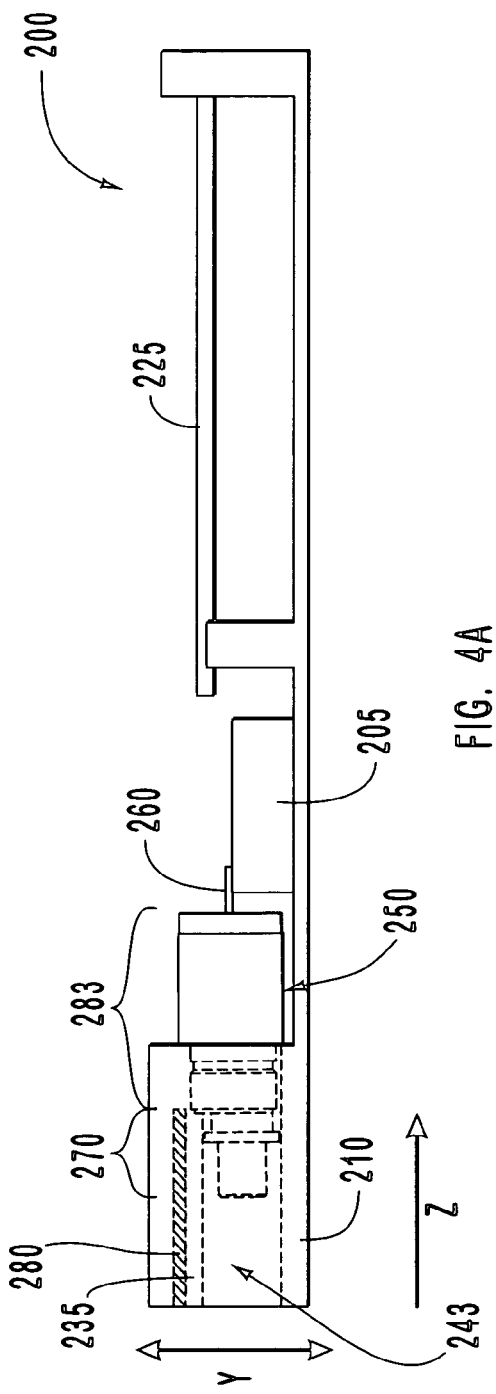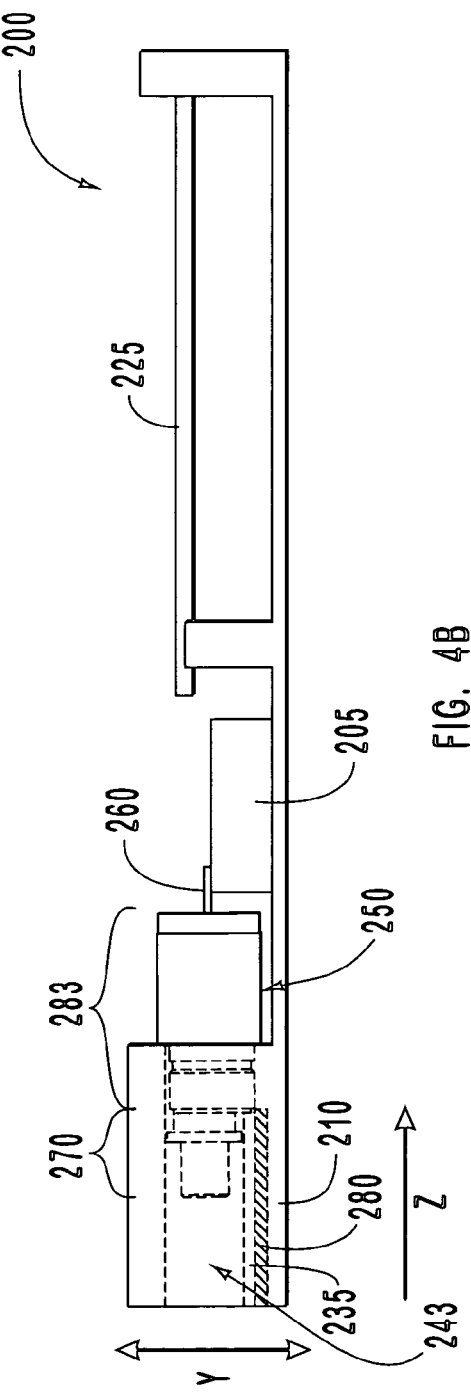

OPTICAL TRANSCEIVER WITH VARIABLY POSITIONED INSERT

CROSS-REFERENCE TO RELATED APPLICATIONS

The present invention claims the benefit of priority to U.S. Provisional Patent Application No. 60/533,307, filed on Dec. 30, 2003, entitled "Optical Transceiver with Variably Positioned Nose Piece", the entire contents of which are incorporated herein by reference.

BACKGROUND OF THE INVENTION

1. The Field of the Invention

The present invention relates generally to optical transceiver modules employed in optical communications networks. More specifically, the present invention relates to an adjustable optical transceiver design that maximizes thermal dissipation from heat-sensitive transceiver components.

2. Background and Relevant Art

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. FIGS. 1A, 1B, and 2A through 2B illustrate conventional configurations of an optical transceiver 100, which includes a frame, a housing 110, and an optical sub assembly (e.g., Transmit Optical Sub-Assembly 150) used to transmit or receive optical information. In particular, a Transmit Optical Sub-Assembly ("TOSA") 150 at the transmission node of an optical network receives an electrical signal from an electronic device, such as a computer, and converts the electrical signal into a corresponding optical signal. The TOSA 150 then transmits the optical signal over a fiber optic cable to a reception node of the network.

The transceiver 100 can also serve as a reception node on the optical network. In particular, the conventional transceiver 100 includes a Receive Optical Sub-Assembly ("ROSA") component 155 (FIG. 2A), which receives the optical signal over the optical fiber, and uses, for example, a photodetector to convert the optical signal into corresponding electrical signals. The electrical signals are then forwarded to a host device, such as a computer, for processing.

Generally, a conventional "OSA", a generic term for the TOSA 150 or ROSA 155, includes a main body 183, a nose piece 170, and, in some cases, an alignment ridge 180 that aids the OSA physical alignment within the transceiver module 100. A conventional transceiver 100 includes an outer housing 110 having inner walls 130, 140, and an alignment ridge 120 that can be used to position the OSAs via, for example, portion 180. The conventional transceiver walls 130, 140 surround one or more internal cavities, which serve as one or more fiber optic receptacles for conventional "LC" or "SC" optical connector ends. Mounted inside an assembled transceiver module 100 generally, therefore, are the TOSA 150, ROSA 155, and a transceiver substrate (e.g., a printed circuit board) 125. The TOSA 150 and ROSA 155 are connected to the transceiver substrate 125 via any number of connectors, such as the illustrated flex connectors 165.

Since OSA performance, in particular TOSA performance, can be affected adversely by excessive temperatures, it is important in some cases to provide adequate, reliable means to remove the heat from the TOSA and from the transceiver, generally. One way in which this is typically done with cylindrical TOSAs (e.g., 150) is with a thermally conductive extension 160, which conducts heat from the inner core of the TOSA 150 onto a separate heat dissipating element 105. The heat dissipating element 105 in turn distributes the heat outside of the transceiver module 100. In contrast with cylindrical TOSAs 150, a box-shaped OSAs (not shown) disperses heat directly to the transceiver housing 110 due to surface-to-surface contact, and hence without a separate heat dispersion tongue 160.

Unfortunately, some challenges arise in providing adequate TOSA heat dissipation, based at least in part on alignment procedures inherent in the manufacturing process. For example, the TOSA front end 170 (as well as the ROSA front end) is typically aligned as a separate component to the TOSA body 183, prior to mounting the TOSA 150 to a transceiver package. Any variability, however slight, that is introduced when aligning the TOSA front end 170 to the back end 183 can make it difficult to both conduct heat out of the TOSA and at the same time ensure that the TOSA 150 and ROSA 155 are both properly aligned for a given optical cable connector interface.

In particular, this variability between a TOSA and ROSA in the transceiver module can pose a particular challenge for using conventional heat dissipating components (e.g., 105). Generally speaking, if heat dissipating components were composed of substantially flexible materials, there would be less difficulty in aligning and fitting a given TOSA in a transceiver assembly in n appropriate position relative to the ROSA. In particular, a flexible heat dissipating component could be made somewhat larger than required, and then compressed to the appropriate fit, to ensure the TOSA and ROSA front ends are aligned with similar X and Y positioning inside the transceiver housing. Flexible materials, however, are not good thermal conductors, and therefore poor heat dissipaters.

On the other hand, rigid heat dissipating elements create other difficulties related to whether the TOSA and ROSA in a transceiver can be coupled with a conventional optical fiber connector interface. In short, when aligning the relevant OSA (TOSA or ROSA) front end to its respective back end, the OSA front end is often slightly offset relative to its respective OSA body by a measure of thousandths of an inch. With conventional OSAs that do not require heat dissipation, this is not ordinarily a very big problem since the front ends of each OSA are still secured (e.g., by alignment ridge 120 on the transceiver frame, and alignment ridge 180 on the OSA) in a uniform spatial position in the transceiver housing 110. In particular, transceivers that do not require heat dissipation also allow the respective back ends of the TOSA and ROSA to vary with respect to each other. For example, the respective back ends of the TOSA and ROSA are typically connected to the transceiver substrate 125 with some sort of flexible connector, such as the illustrated flex circuit 165, which accommodates the back end variation.

Unfortunately, when using a rigid heat dissipation element (e.g., 105), the TOSA 150 back end can not be allowed to float freely. In particular, the TOSA 150 that implements heat dissipation also has its back end (e.g., 183, and conductive tongue 160) secured to the rigid heat dissipation element 105. This securing of the OSA back end can cause a corresponding, slightly-offset spatial position of the TOSA front end 170 relative to the ROSA 155 front end 175 position inside the transceiver housing 110, due to the previously described OSA alignment variations.

In many cases, this offset spatial position of the TOSA front end 170 is different enough from the spatial position of the ROSA front end 175 inside the transceiver housing 110 that the TOSA front end 170 and ROSA front end 175 do not adequately align with a conventional optical fiber connector. In particular, differences of thousandths of an inch in OSA alignment can cause significant stress on the transceiver when trying to get rigidly mounted parts to fit in a defined optical connector space. Such seemingly miniscule differences, which are amplified in small form factor components, can also cause failure of the optical cable to connect to the transceiver in the first instance.

Accordingly, an advantage in the art can be realized with optical transceivers that can dissipate heat more reliably in systems such as small form factor systems. In particular, an advantage can be realized with heat dispersion systems that dissipate heat efficiently in an optical transceiver, without significantly complicating important positioning between a TOSA and ROSA, such that the TOSA and ROSA can still readily connect to a standardized optical fiber connector.

BRIEF SUMMARY OF THE INVENTION

The present invention solves one or more of the foregoing problems in the art with an optical transceiver package that allows for efficient thermal conductivity, as well as acceptable OSA alignment within the optical transceiver receptacles. In particular, an optical transceiver in accordance with the present invention holds the TOSA and ROSA front ends in an appropriate position for an optical fiber connector, and also allows the TOSA to be secured to a rigid heat dissipating element.

For example, in one implementation of the present invention, an optical transceiver includes a heat dissipating element. The optical transceiver also includes an OSA insert having two OSA cavities formed therein, the cavities being configured to fit snugly about a corresponding TOSA and ROSA. The OSA insert is positioned inside the optical transceiver housing with one or more degrees of freedom, so that the OSA insert moves as the TOSA back end is moved when being mounted to the heat dissipating element. Since the OSA insert moves when the TOSA front end moves with the TOSA back end, the OSA insert preserves the ROSA front end position relative to the TOSA front end position inside the transceiver housing. This allows for effective heat dissipation in an optical transceiver without complicating important ROSA and TOSA spatial orientations for a given optical fiber connector.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates a conventional optical transceiver frame and housing;

FIG. 1B illustrates a conventional cylindrical OSA that is used in conjunction with the conventional optical transceiver frame and housing shown in FIG. 1A;

FIG. 2A illustrates a perspective view of a conventional optical transceiver, having a TOSA and ROSA mounted inside the transceiver frame shown in FIG. 1A;

FIG. 2B illustrates a side view of a conventional TOSA shown in FIGS. 1B and 2A when coupled to a heat dissipating element;

FIG. 3A illustrates a perspective view of an optical transceiver in accordance with an implementation of the present invention, in which a TOSA and ROSA are mounted inside an optical transceiver frame and housing via an OSA insert;

FIG. 3B illustrates a perspective view of the TOSA and ROSA when mounted inside the OSA insert, but removed from the transceiver frame and housing;

FIG. 3C illustrates a facing view of the TOSA and ROSA shown in FIG. 3B;

FIG. 4A illustrates a side view of the optical transceiver shown in FIG. 3A, in which a TOSA that is assembled with one alignment variation is mounted to a heat dissipating element; and FIG. 4B illustrates a side view of the optical transceiver shown in FIG. 4A, in which a TOSA assembled with another alignment variation is mounted to the heat dissipating element.

DETAILED DESCRIPTION OF THE PREFERRED EMBODIMENTS

The present invention extends to an optical transceiver package that allows for efficient thermal conductivity, as well as acceptable OSA alignment within the optical transceiver receptacles. In particular, an optical transceiver in accordance with the present invention holds the TOSA and ROSA front ends in an appropriate position for an optical fiber connector, and also allows the TOSA to be secured to a rigid heat dissipating element.

For example, FIG. 3A illustrates an implementation of the present invention in which an optical transceiver 200 comprises a duplex OSA insert 235 positioned within a transceiver housing 210. In general, the OSA insert 235 can be formed from any number of materials, including metal, metal alloys, plastic, and or ceramic materials. In one implementation, for example, the OSA insert 235 comprises a plastic material, which is configured with several mils of tolerance in any X or Y orientation inside optical transceiver housing 210. The OSA may also be surrounded by one or more joints, shims, ribs, or the like, which are easily configured to fit the OSA insert 235 inside the transceiver housing 210. In one implementation, the joints, shim, ribs, or the like are also thermally conductive.

In one implementation, an optical transceiver housing 210 includes housing walls that are about 20 mils thick (1 "mil" is about 1 thousandth of an inch), and that form a gap of about 10 mils between the OSA insert 235 (FIG. 3B) walls, which are also about 20 mils thick. An approximately 10 mil gap such as this can allow the OSA insert 235 to be variably positioned inside the optical transceiver housing 210.

FIG. 3A also shows that the OSA insert 235 is formed with cavities 243 and 245, as well as corresponding mounting gaps 232, which accommodate a conventional optical LC fiber connector. One will appreciate, however, that the LC connector is only one type of connector that can be used in accordance with the present invention, and that the OSA insert 235 can also be configured for other types of optical fiber connection interfaces, such as an SC, or other similar optical connector interface. The illustrated LC connector configuration, therefore, is shown primarily for purposes of convenience. In any event, FIGS. 3A and 3B show that the optical connector interface is formed primarily in the OSA insert 235 cavities 243, 245, rather than necessarily in the transceiver housing 210.

FIGS. 3A, 3B, and 3C show that the optical transceiver 200 also includes a TOSA 250 having at least a portion (e.g., front end 270) of the TOSA being inserted snugly inside cavity 243 of the OSA insert 235, and a ROSA 255, which has at least a portion (e.g., front end 275) of the ROSA 255 inserted snugly inside cavity 245. These illustrated snug fits accomplish one or more of any number of ends. For example, the cavities 243 and 245 are configured to help define an X-Y spatial orientation of the TOSA 250 front end 270 relative to the ROSA 255 front end 275, so that the respective TOSA and ROSA front ends are suitably positioned to interface with a given optical connector. Furthermore, the snug fit of the OSA insert 235 around the TOSA 250 front end 270 and ROSA 255 front end 275 provides that movement of one of the OSA back ends (e.g., 260) results in a corresponding movement of the other of the OSAs, thereby preserving the TOSA to ROSA front end orientation in a number of positions of the OSA insert 235.

As shown in FIGS. 3A through 3C, for example, the OSA insert 235 comprises one or more ribs 237 that help position the OSA insert 235 within varying degrees of tolerance inside the transceiver housing 210. In one implementation, the illustrated ribs 237 not only provide a degree of alignment tolerance inside the transceiver housing 210, but can also provide one or more thermal contact points between the OSA insert 235 and the inside surface of the transceiver housing 210. Thus, the OSA insert 235 can comprise materials and conformations that make one or more implementations of the OSA insert 235 ideal for dissipating an amount of heat.

In addition, since the OSA insert 235 can be positioned with varying degrees of freedom along the X and Y axis inside the transceiver housing 210, the TOSA 250 can be mounted to rigid heat dissipating elements 205 without adversely affecting front end alignment. In particular, the configurable OSA insert 235 can be particularly useful where variations between the TOSA front end 270 are fairly distinct relative to the back end 283. For example, a TOSA 250 front end 270 alignment that varies by, for example, 2 mils, relative to the TOSA 250 back end 283 will have a different spatial position at the front end 270 inside the transceiver housing 210 compared with a TOSA 250 that has a front end 270 that varies by more or less than this with respect to its back end 283. Thus, the variation in alignment of a specific TOSA's front end 270 with respect the TOSA's back end 283 at least partly drives the position of the relevant OSA insert 235, and hence the corresponding ROSA 255 front end 275 position inside the transceiver housing 210.

The heat dissipating elements 205 described herein can comprise any number of thermally-conductive materials, including thermally-conductive metals such as copper or aluminum. There are, of course, a wide range of thermally-conductive elements that may be useful for heat dissipating element 205, including thermally conductive plastics and ceramics, although copper and aluminum are generally more available. Furthermore, appropriate heat dissipation can be produced in materials that not only conduct heat, but also provide different degrees of electrical conduction (or lack thereof). Of course, metals such as copper and aluminum are typically good conductors of both heat and electricity. Some other materials, however, such as an aluminum nitrite ceramic may be a good conductor of heat, but a poor conductor of electricity. Accordingly, a manufacturer can adjust the materials used as the heat dissipating element 205 for a wide variety of implementations.

The apparatus described herein, therefore, provide a degree of flexibility in assembling an optical transceiver 200. For example, in one implementation of an optical transceiver 200 assembly, the front ends 270 and 275 of the respectively assembled TOSA 250 and ROSA 255 are each inserted in a corresponding cavity 243 and 245 of an OSA insert 235. The OSA insert 235 is then configured or adjusted to fit inside the transceiver housing 210 within a few mils of alignment tolerance. For example, the manufacturer can shave off one or more ribs 237 so that the thermally-conductive TOSA tongue 260 is able to abut the heat dissipation element 205 directly. The manufacturer can then position the OSA insert 235 inside the optical transceiver housing 210.

In another implementation, the OSA insert 235 is already fitted inside the transceiver housing 210 within an acceptable degree of tolerance, and the respective front ends 270 and 275 of the TOSA 250 and ROSA 255 are then inserted into the appropriate cavity. In any event, the manufacturer then mounts the TOSA 250 to the heat dissipating element 205. In one implementation, for example, the manufacture mounts the TOSA 250 by positioning a thermally-conductive tongue 260 of the TOSA 250 about the heat dissipation element 205. The manufacturer can then secure the tongue 260 to the heat dissipating element 205 using a chemical bond (e.g., an adhesive between the tongue 260 and the element 205), or using a mechanical bond (e.g., a clamp and screw about the tongue 260 and the element 205), and/or any combination thereof. The type of chemical or mechanical bonding means can be chosen based on any number of properties, such as bonding strength, as well as thermal conductivity properties.

The positioning of the tongue 260 about the heat dissipating element 205 may cause the manufacturer to further adjust the OSA insert 235 position inside the transceiver housing 200 to accommodate some other variability. In any case, this and/or any prior X/Y adjustments can cause a fairly significant gap between at least one side of the OSA insert 235 and an inside surface of the transceiver housing 210. Accordingly, in one implementation, the manufacturer can further insert filler materials (e.g., FIG. 4B, filler 280) to substantially close any gap between the OSA insert 235 and the corresponding inside surface of the transceiver housing 210. In one implementation, appropriate filter materials 280 include shims or adhesives, although any number or type of filler materials 280 may be consistent with the principles described herein.

Once the OSA insert 235 is appropriately positioned, the TOSA 250 and ROSA 255 can be electrically coupled to a corresponding transceiver substrate 225, which includes one or more circuitry components for driving the TOSA or ROSA, and passing signals to and from an electronic device. The TOSA 250 and ROSA 255 can be electrically coupled to the transceiver substrate 225 using any number of coupling means, including, for example, use of a flex circuit, or a plug connector. In one implementation, the ROSA 255 is electrically coupled to the transceiver substrate 225 using a flex circuit, while the TOSA 250 is electrically coupled to the transceiver substrate 225 via circuit traces on the tongue 260, which are, in turn, coupled to circuitry on the transceiver substrate. Any number and/or combination of electrical coupling methods, however, can be appropriate in accordance with the concepts presented herein.

FIGS. 4A and 4B show alternate side views of the transceiver 200, in which the TOSA 250 with one alignment variation between the TOSA front end 270 and back end 283 is mounted to a heat dissipation element 205. In particular, FIGS. 4A and 4B show alignment variations in which the TOSA front end 270 is offset in one or more vertical positions relative to the vertical position of the TOSA back end 283. One will appreciate, however, that horizontal alignment variations (not shown), as well as other alignment variations in the X/Y plane may also be possible, which ultimately effect the positioning of the OSA insert 235 inside the transceiver housing 210. As such, the alignment variations of FIGS. 4A and 4B are merely exemplary. In any event, FIG. 4A shows that when the TOSA 250 tongue 260 is mounted to a heat dissipation element 205, the corresponding front end 270 shifts the OSA insert 235 inside the transceiver housing 210 in one direction. Accordingly, significant gaps that form between the transceiver housing 210 and the OSA insert 235 are filled with filler materials 280.

FIG. 4B shows that another TOSA 250 having a different alignment variation, compared with the TOSA in FIG. 4A, is mounted to heat dissipating element 205. The mounting of the tongue 260 in FIG. 4B causes a certain positioning of the TOSA front end 270, which causes a different positioning of the OSA insert 235 relative to the transceiver housing 210. In particular, FIG. 4B shows that the ribs 237 on the bottom of the OSA insert are shaved away (e.g., using a jig, or other appropriate tool), such that the OSA insert 237 is closer to one inside surface of the transceiver housing 210. This adjustment of the OSA insert 237 allows the TOSA tongue 260 to abut the heat dissipation element 205 in a substantially flush fashion. As previously described, the resulting gap between the upper end of the OSA insert 235 and the inside surface of the transceiver housing 210 can be filled with a filler material 280, in order to accommodate the closer proximity of the lower end of the OSA insert 235 relative to the transceiver housing 210.

Accordingly, implementations of the OSA insert 235 accommodate spatial variations that occur due to alignment variations between an OSA front end and back end. In particular, implementations of the present invention can accommodate several mils of front end 270 spatial variation, and at the same time ensure that the ROSA 255 and TOSA 250 are still aligned appropriately for the given optical connection interface.

The apparatus described herein has also been described primarily as a means for enabling the thermal coupling of a TOSA 250 to a heat dissipation element 205. One will appreciate, however, that the OSA insert 235 has a number of advantages by itself, such as that the OSA insert 235 can be shaped, adjusted, or modified in any number of ways, and still maintain an appropriate TOSA 250 and ROSA 255 alignment for any given optical connector interface. In particular, since the OSA insert 235 can be manufactured from a variety of thermally-conductive materials, a manufacturer may simply avoid the heat dissipation element 205 altogether in certain transceiver modules in lieu of the thermal-conductivity properties of the OSA insert 235. Accordingly, the transceiver apparatus and components in accordance with the present invention provide a wide variety of manufacturing options and advantages pursuant to creating thermally-efficient optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A fiber optic transceiver having thermally conductive properties comprising:
    a transceiver module including one or more fiber optic receptacles, the one or more fiber optic receptacles each having an inner cavity;
    an OSA having a back end and a front end, the back end being mounted to a thermal spreader in contact with a transceiver housing at the transceiver module;
    a housing insert, the housing insert having an inner dimension that allows the housing insert to encompass a portion of the OSA and an outer dimension that abuts a portion of a fiber optic receptacle inner cavity.

2. The fiber optic receptacle of claim 1, wherein the housing insert comprises one or more ribs radiating from a body of the housing insert, the insert comprising a flexible material.

3. The fiber optic receptacle of claim 1, wherein the OSA is electrically coupled to the transceiver substrate through one or more of a flex circuit, a direct electrical mount, and a plug.

4. The fiber optic receptacle of claim 1, wherein the OSA includes a main body that comprises one or more cylindrical shells, the housing insert fitting against one or more tangential points of at least one of the one or more cylindrical shells.

5. The fiber optic receptacle of claim 1, wherein the housing insert is fixed to the transceiver housing with a thermally conductive adhesive, the housing insert being fixed to the transceiver housing after the OSA back end has been mounted to the thermal spreader.

6. The fiber optic receptacle of claim 1, wherein the transceiver substrate is a printed circuit board having active circuitry.

7. The fiber optic receptacle of claim 1, wherein the transceiver housing has walls that are approximately 20 mils thick, and the housing insert has walls that are approximately 20 mils thick.

8. The fiber optic receptacle of claim 1, wherein the OSA includes a thermally-conductive extension, and wherein the OSA is connected to the heat spreader via the thermally-conductive extension.

9. The fiber optic receptacle of claim 8, wherein the thermally-conductive extension extends from within the OSA out of the OSA back end.

10. The fiber optic receptacle of claim 1, wherein the housing insert includes a formation for a standard fiber optic connector.

11. The fiber optic receptacle of claim 10, wherein the housing for the standard fiber optic connector is configured as an LC connector.

12. The fiber optic receptacle of claim 1, wherein the housing insert is configured to move within the fiber optic receptacle inner cavity to accommodate a position of the OSA front end.

13. A method of manufacturing a fiber optic transceiver comprising:
    mounting an OSA back end to a thermal spreader;
    mounting at least a portion of the OSA within a flexible housing insert, wherein the portion of the OSA within the flexible housing insert is aligned to the OSA back end;
    mounting the flexible housing insert within a fiber optic receptacle of the transceiver housing such that the flexible housing insert flexes to accommodate a position of the portion of the OSA within the fiber optic receptacle; and mounting the OSA back end to the thermal spreader prior to aligning an OSA front end within the transceiver housing.

14. The method as recited in claim 13, further comprising mounting the thermal spreader to the transceiver prior to mounting the OSA back end to the thermal spreader.

15. A method of manufacturing a fiber optic transceiver comprising:

mounting an OSA back end to a thermal spreader;

mounting at least a portion of the OSA within a flexible housing insert, wherein the portion of the OSA within the flexible housing insert is aligned to the OSA back end;

mounting the flexible housing insert within a fiber optic receptacle of the transceiver housing such that the flexible housing insert flexes to accommodate a position of the portion of the OSA within the fiber optic receptacle; and electrically coupling the OSA to a transceiver substrate.

16. The method as recited in claim 15, wherein the transceiver substrate has been mounted to the transceiver prior to electrically coupling the OSA with the transceiver substrate.

17. A method of manufacturing a fiber optic transceiver comprising:

mounting an OSA back end to a thermal spreader;

mounting at least a portion of the OSA within a flexible housing insert, wherein the portion of the OSA within the flexible housing insert is aligned to the OSA back end;

mounting the flexible housing insert within a fiber optic receptacle of the transceiver housing such that the flexible housing insert flexes to accommodate a position of the portion of the OSA within the fiber optic receptacle; and adhering the flexible housing insert within a fiber optic receptacle formed within the transceiver housing.

18. The method as recited in claim 17, wherein a distance of approximately 10 mils separates an outer dimension of the flexible housing insert and an inner dimension of the fiber optic receptacle.

19. In a system where a position of an optical sub-assembly front end varies in relation to a position of the optical sub-assembly back end from one optical sub-assembly to another, a fiber optic transceiver that uses a uniformly-sized heat spreader for a given optical sub-assembly, the fiber optic transceiver comprising:

a transceiver module having a fiber optic receptacle, the fiber optic receptacle having an inner cavity;

a heat spreader connected to the transceiver module and configured to connect with a back end of an optical sub-assembly; and a housing insert that receives a front end of the optical sub-assembly and is positioned within the inner cavity of the fiber optic receptacle, wherein the housing insert is movable within the inner cavity to accommodate a position of the front end of the optical sub-assembly within the inner cavity, wherein at least a portion of the housing insert compresses against a wall of the inner cavity to accommodate a position of the optical sub-assembly front end.

20. The system of claim 19, wherein the housing insert comprises one or more ribs radiating from a body of the housing insert, the insert comprising a flexible material.

21. The system of claim 19, wherein the optical sub-assembly includes a main body that comprises one or more cylindrical shells, the housing insert fitting against one or more tangential points of at least one of the one or more cylindrical shells.

22. The system of claim 19, wherein the housing insert is fixed to the transceiver housing with a thermally conductive adhesive, the housing insert being fixed to the transceiver housing after the optical sub-assembly back end has been mounted to the thermal spreader.

* * * * *